United States Patent
Räsänen (10) Patent No.: US 6,665,312 B1
(45) Date of Patent: Dec. 16, 2003

(54) SYNCHRONOUS DATA TRANSMISSION METHOD AND ARRANGEMENT

(75) Inventor: Juha Räsänen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/068,741

(22) PCT Filed: Nov. 13, 1996

(86) PCT No.: PCT/FI96/00616

§ 371 (c)(1),
(2), (4) Date: Aug. 18, 1998

(87) PCT Pub. No.: WO97/18644

PCT Pub. Date: May 22, 1997

(30) Foreign Application Priority Data

Nov. 15, 1995 (FI) .................................................. 955496

(51) Int. Cl.[7] .............................. H04J 3/16; H04J 3/06
(52) U.S. Cl. ...................................... 370/465; 370/509
(58) Field of Search ................................ 370/503, 514,
370/511, 509, 522, 523, 528, 529, 512,
474, 513, 432, 312–316, 349–350, 465–468;
375/222, 356; 455/502

(56) References Cited

U.S. PATENT DOCUMENTS

| 5,099,517 | A | | 3/1992 | Gupta et al. | |
|---|---|---|---|---|---|
| 5,260,989 | A | * | 11/1993 | Jenness et al. | 370/277 |
| 5,335,225 | A | * | 8/1994 | Brax | 370/282 |
| 5,412,660 | A | | 5/1995 | Chen et al. | |
| 5,450,472 | A | * | 9/1995 | Brax | 455/557 |
| 5,483,531 | A | * | 1/1996 | Jouin et al. | 370/277 |
| 5,502,752 | A | * | 3/1996 | Averbuch et al. | 375/377 |
| 5,583,859 | A | * | 12/1996 | Feldmeier | 370/471 |
| 5,802,154 | A | * | 9/1998 | Dimolitsas et al. | 379/93.08 |
| 5,809,066 | A | * | 9/1998 | Suomi et al. | 455/557 |
| 5,963,621 | A | * | 10/1999 | Dimolitsas et al. | 379/93.08 |
| 5,966,374 | A | * | 10/1999 | Rasanen | 370/337 |

OTHER PUBLICATIONS

"European Digital Cellular Telecommunications System (Phase 2); Technical Realization of Facsimile Group 3 Transparent (GSM 03.45)", European Telecommunications Standards Institute, GSM 03.45, Version 4.4.0, May 10, 1994, pp. 1–45.

* cited by examiner

Primary Examiner—Min Jung
Assistant Examiner—Andy Lee
(74) Attorney, Agent, or Firm—Pillsbury Winthrop LLP (57) ABSTRACT

The invention relates to a synchronous data transmission when the maximum data rate of the traffic channel equals one of the user data rates at the terminal interface. Such a situation may occur for example when a satellite system is connected as a base station system to a mobile system. A mobile station (MS) inserts the terminal interface status information (STATUS) in the redundant parts (REDUNDANT) of the protocol data units (PDU) of the transmission protocol used at the terminal interface and transmits the protocol units through a satellite traffic channel to a land earth station (LES). The land earth station (LES) is arranged to extract said status information from the protocol data units and to restore the original redundancy to the protocol data units.

13 Claims, 8 Drawing Sheets

| OCTET NO. | BIT NUMBER | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | E1 | E2 | E3 | E4 | E5 | E6 | E7 |
| 6 | 1 | D25 | D26 | D27 | D28 | D29 | D30 | S6 |
| 7 | 1 | D37 | D38 | D39 | D40 | D41 | D42 | S8 |
| 8 | 1 | D43 | D44 | D45 | D46 | D47 | D48 | S9 |

V.110 FRAME

SYNCHRONOUS DATA TRANSMISSION METHOD AND ARRANGEMENT

This application is the national phase of international application PCT/FI96/00616, filed Nov. 13, 1996 which designated the U.S.

FIELD OF THE INVENTION

The present invention relates to synchronous data transmission in a telecommunication system, especially in a case where the maximum data rate of the traffic channel is equal to one of the user data rates at the terminal interface.

BACKGROUND OF THE INVENTION

Mobile systems generally refer to different telecommunication systems that enable private wireless data transmission for subscribers moving within the system. A typical mobile system is a public land mobile network (PLMN). The PLMN comprises fixed radio stations is (base stations) located in the service area of the mobile network, the radio coverage areas (cells) of the base stations providing a uniform cellular network. A base station provides in the cell a radio interface (air interface) for communication between a mobile station and the PLMN. Since mobile stations can move in the network and they have access to the PLMN through any base station, the PLMNs are provided with complicated arrangements for subscriber data management, authentication and location management of mobile subscribers, for handovers (a change of a base station during a call) etc. The networks are also provided with services that support the transmission of information other than the usual speech calls (speech service), such as data, facsimile, video image, etc. These new services have required a considerable amount of developmental work and new arrangements in the networks.

Another area of mobile systems includes satellite-based mobile services. In a satellite system, radio coverage is obtained with satellites instead of terrestrial base stations. The satellites are located on an orbit circling the earth and transmitting radio signals between mobile stations (or user terminals UT) and land earth stations (LES). The beam of the satellite provides on the earth a coverage area, i.e. a cell. The coverage areas of individual satellites are arranged to form continuous coverage so that a mobile station is located at all times within the coverage area of at least one satellite. The number of the satellites needed depends on the desired coverage. Continuous coverage on the surface of the earth might require for example 10 satellites.

Subscriber mobility requires similar arrangements in satellite mobile systems as in the PLMNs, i.e. subscriber data management, authentication and location management of mobile subscribers, handovers, etc. The satellite systems should also support similar services as the PLMNs.

One way of implementing these requirements in satellite mobile systems is to use existing PLMN arrangements. In principle this alternative is very simple since a satellite system can be basically compared to a base station system of a mobile system having an incompatible radio interface. In other words, it is possible to use a conventional PLMN infrastructure where the base station system is a satellite system. In such a case, the same network infrastructure could in principle even contain both conventional PLMN base station systems and satellite "base station systems".

There are many practical problems related to the adaptation of the PLMN infrastructure and a satellite system, however. A problem apparent to the Applicant is that a PLMN traffic channel and a traffic channel of a "radio interface" in a satellite system differ considerably. Examine an example where the PLMN is the Pan-European digital mobile system GSM (Global System for Mobile Communication) and the satellite mobile system is the Inmarsat-P system that is currently under development.

A traffic channel in the GSM system supports data transmission at the user rates of 2400, 4800, 7200 and 9600 bit/s. In the future, high-speed data services (HSCSD=High speed circuit switched data) employing two or more traffic channels at the radio interface (multi-slot access) also support higher user rates (14400 bit/s, 19600 bit/s, . . . ). A data connection provided by one traffic channel is V.110-rate-adapted. A V.110 connection is a digital transmission channel that was originally developed for ISDN (Integrated Services Digital Network) technology and that is adapted to a V.24 interface. In V.110 frames, terminal interface status information (V.24 interface control signals), such as CT105 (RTS=ready to send), CT108 (DTR=data terminal ready), CT106 (CTS=clear to send), CT107 (DSR=data set ready) and CT109 (CD=Data carrier detect), is also transmitted in both transmission directions in addition to the user data. Further, in multichannel transparent HSCSD data service it is also necessary to transfer intersubchannel synchronization information. The aforementioned additional information increases the bit rate at the radio interface higher than the actual user rate. The radio interface rates corresponding to the user rates of 2400, 4800 and 9600 bit/s are 3600, 6000 and 12000 bit/s. In addition, the traffic channel employs channel coding that aims at decreasing the effect of transmission errors.

The Inmarsat-P satellite system requires that standard data rates up to 4800 bit/s can be supported by one traffic channel (e.g. 1200, 2400, 4800 bit/s) and that standard data rates exceeding 4800 bit/s (e.g. 9600, 14400, 19200 bit/s, etc.) can be supported by using several parallel traffic channels, such as in the HSCSD service of the GSM system.

In the Inmarsat-P satellite system, the data rate of one traffic channel at the radio interface is at most 4800 bit/s, which equals the user data rate of 4800 bit/s at the terminal interface. In a data service employing two traffic channels the data rate at the radio interface equals the user data rate of 9600 bit/s at the terminal interface. A problem occurs when not only the user data but also the above-described terminal interface status information and possible intersubchannel synchronization information should be transmitted over the radio interface. Therefore the protocol data unit, i.e. the frame structure, used by the satellite system at the radio interface should be defined to carry the aforementioned control and synchronization information over the radio interface. One manner would be to use directly the GSM system arrangement, i.e. a V.110-based frame structure, also at the radio interface of the satellite system. However, this would be a very complicated arrangement and it would significantly reduce the user data rates available. A single traffic channel could not support the user data rate of 4800 bit/s since the V.110 frame structure and the terminal interface status information increase the actual data rate higher than 4800 bit/s. Therefore the highest standard user data rate on one traffic channel would be 2400 bit/s. For the same reason, a two traffic channel data service could not support the user rate of 9600 bit/s, but the highest standard user data rate would be 4800 bit/s (or in some systems 7200 bit/s). A corresponding decrease in the available data rates would also occur in data services employing more than two traffic channels. Such an arrangement where the overhead information causes a significant loss of capacity would not be satisfactory.

A similar problem can also occur when connecting other types of radio interfaces, such as wireless telephone systems, to PLMNs.

DISCLOSURE OF THE INVENTION

An object of the present invention is an arrangement supporting the transmission of user data, terminal interface status information and possibly other control or synchronization information through a transparent traffic channel having a data rate equal to the user data rate at the terminal interface.

This is achieved with a synchronous data transmission method for transmitting terminal interface user data and status information and possibly other control or synchronization information through a traffic channel or a set of traffic channels in a telecommunication system. The method comprises the steps of     inserting, at the transmitting end, the terminal interface status information and possibly other control or synchronization information in redundant parts of protocol data units of the transmission protocol used at the terminal interface,     transmitting the protocol data units containing said terminal interface status information and possibly other control or synchronization information through said traffic channel or set of traffic channels,     extracting, at the receiving end, said status information and possibly other control or synchronization information from the protocol data units and restoring the original redundancy to the protocol data units.

The invention also relates to an arrangement for transmitting terminal interface user data and status information and possibly other control and synchronization information through a traffic channel in a telecommunication system. In the arrangement     the transmission equipment (MS, LES) is arranged to insert the terminal interface status information and possibly other control or synchronization information in the redundant parts of the protocol data units of the transmission protocol used at the terminal interface, and to transmit the protocol data units through said traffic channel or set of traffic channels to the receiving equipment (MS, LES),     the receiving equipment (MS, LES) is arranged to extract said status information and possibly other control and synchronization information from the protocol data units, and to restore the original redundancy to the protocol data units.

In the invention, the terminal interface status information and possibly other control or synchronization information are transmitted through the traffic channel in the redundant parts of the protocol data units of the transmission protocol(s) used. In the receiving end, the status information and possibly other information are extracted from the protocol data units and the original redundancy is restored to the protocol data units. As a consequence, the overhead information does not increase the number of the bits to be transmitted, and the data rate of the traffic channel can be the same as the user data rate at the terminal interface. In high-rate data transmission, a data connection may comprise a set of two or more traffic channels, so that the total data rate of the set of traffic channels can be the same as the user data rate at the terminal interface.

The invention is based on the fact that many transmission protocols have redundant bits in their frame structures when used in the PLMN environment, e.g. in a GSM network, or the redundancy is due to the repetition in the frame structures or some other similar reason.

The bearer services of the PLMNs, for example, employ a point-to-point connection, i.e. a circuit-switched connection is used between two points. Most transmission protocols are also intended for point-to-multipoint connections and their frame structures contain an address field. This address field is redundant in a point-to-point connection. In an embodiment of the invention, the terminal interface status information and possibly other control or synchronization information are transmitted in such an address field. Such protocols include for example HDLC-based (High Level Data Link) protocols.

The synchronous facsimile protocol according to GSM recommendation 03.45 employs an HDLC frame comprising a redundant address field in the Binary Coded Signalling phase and in the error-corrected facsimile data transmission phase. It also comprises other phases where GSM-specific frames are transmitted. These frames contain redundancy in the form of repeated pieces of the same information.

If the facsimile service utilizes the normal facsimile data (NFD) mode according to ITU-T T.30, the data contains End-of-Line (EOL) strings, facsimile-coded data and possibly stuff data to ensure the minimum length of a line. This stuff data can be considered redundant from the point of view of transmission.

BRIEF DESCRIPTION OF THE DRAWINGS

In the following, the invention will be described by means of preferred embodiments with reference to the accompanying drawings, in which.

PREFERRED EMBODIMENTS OF THE INVENTION

The present invention can be applied for data transmission through any traffic channel having a data rate equal to the user data rate at the terminal interface. The preferred embodiments of the invention will be described by using as an example the interworking between a GSM-based mobile system and the Inmarsat-P satellite system connected thereto as a "base station system". However, the invention is not to be restricted to these systems.

The structure and operation of the GSM mobile system are well known to a person skilled in the art and they are defined in the GSM specification of the ETSI (European Telecommunications Standards Institute). Reference is also made to *GSM System for Mobile Communication* by M. Mouly and M. Pautet (Palaiseau, France, 1992, ISBN:2-9507190-0-7). GSM-based mobile systems include DCS1800 (Digital Communication System) and the US digital cellular system PCS (Personal Communication System).

Figure 1:
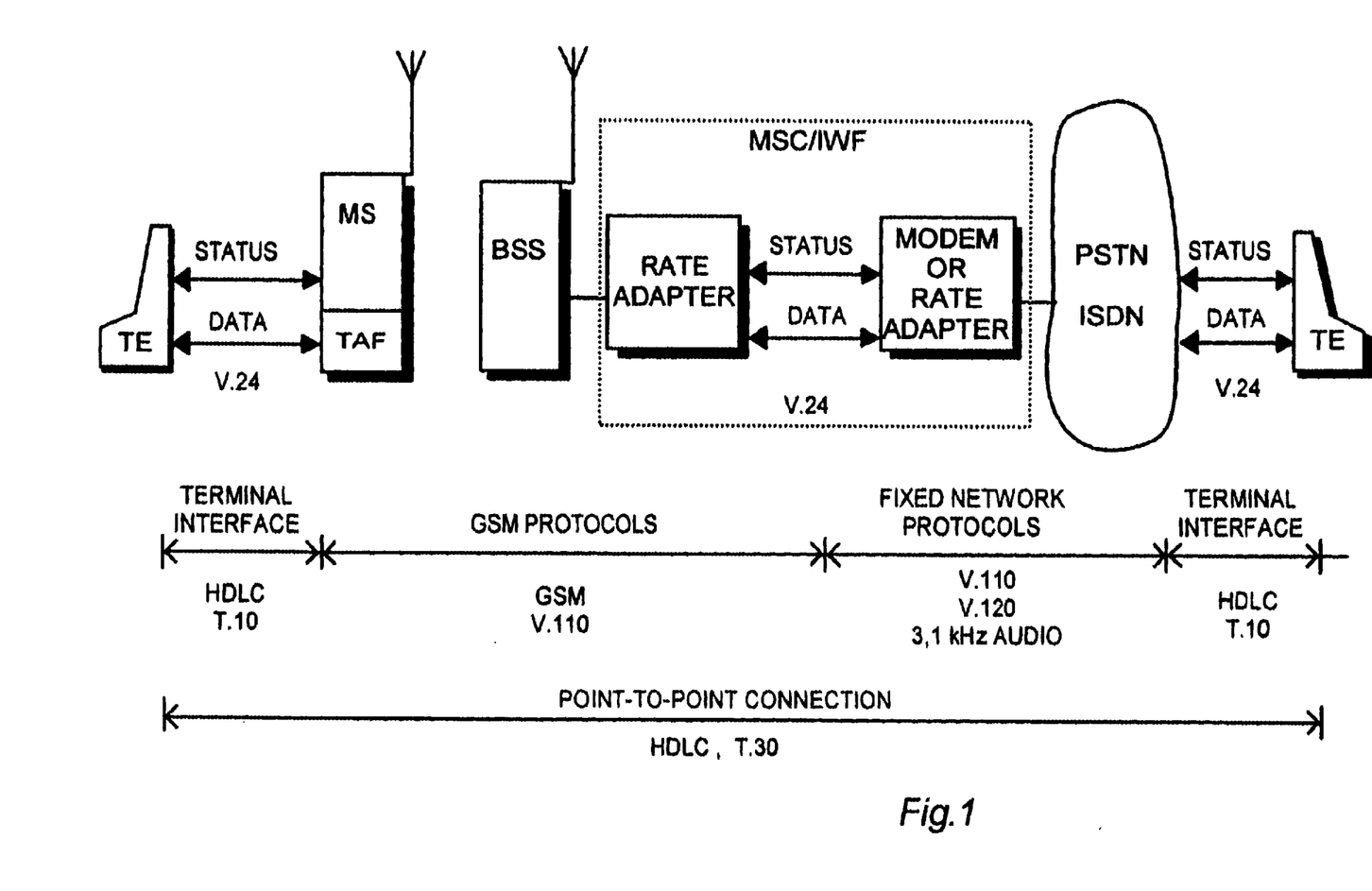
FIG. 1 is a block diagram illustrating a configuration according to the GSM recommendations for data transmission.

The configuration according to the GSM recommendations for data transmission is illustrated in FIG. 1. The basic structure of the GSM mobile system is shown in FIG. 1. The GSM structure comprises two parts: a base station system BSS and a network subsystem NSS. The BSS and the mobile stations MS communicate via radio connections. In the BSS, each cell is serviced by a base station BTS (not shown in the figure). A number of base stations are connected to a base station controller BSC (not shown in FIG. 1) the function of which is to control the radio frequencies and channels used by the BTS. The BSSs are connected to a mobile services switching centre MSC. Certain MSCs are connected to other telecommunication networks, such as the public switched telephone network PSTN and the ISDN.

In the GSM system, a data connection is established between a terminal adaptation function TAF of an MS and an interworking function IWF in the mobile network (usually in the MSC). In data transmission occurring in the GSM network, this connection is a V.110 rate-adapted, UDI-coded digital full-duplex connection that is adapted to V.24 interfaces. The V.110 connection described herein is a digital transmission channel that was originally developed for ISDN (Integrated Services Digital Network) technology, that is adapted to the V.24 interface, and that also provides the possibility of transmitting V.24 statuses (control signals). The CCITT recommendation for a V.110 rate-adapted connection is disclosed in the CCITT Blue Book: V.110. The CCITT recommendation for a V.24 interface is disclosed in the CCITT Blue Book: V.24. In non-transparent data services, a GSM connection also employs a radio link protocol RLP. The TAF adapts the data terminal TE connected to the MS to the aforementioned GSM V.110 data connection which is established over a physical connection utilizing one or several traffic channels (HSCSD). The IWF comprises a rate adapter that adapts the GSM V.110 data connection to the V.24 interface and to a data modem or another rate adapter depending on whether the connection is extended to the PSTN or the ISDN. The ISDN protocols may be for example V.110 or V.120. In the ISDN or the PSTN, a data connection is established for example to another TE. The V.24 interface between the MS and the TE is called here a terminal interface. A corresponding terminal interface is also located in the IWF as well as in the other TE in the ISDN or the PSTN. The protocol used between the TEs may be for example the HDLC protocol according to the ITU-T recommendation X.25, or in facsimile transmission the protocol according to ITU-T T.30.

A GSM traffic channel supports data transmission with the user rates of 2400, 4800, 7200 and 9600 bit/s. In the future, high-speed data services (HSCSD=High speed circuit switched data) employing two or more traffic channels at the radio interface (multi-slot access) also support higher user rates (14400 bit/s, 19600 bit/s, . . . ). In V.110 frames, terminal interface status information (V.24 interface control signals), such as CT105 (RTS=ready to send), CT108 (DTR=data terminal ready), CT106 (CTS=clear to send), CT107 (DSR=data set ready) and CT109 (CD=Data carrier detect), is also transmitted in both transmission directions in addition to the user data. Further, in multichannel transparent HSCSD data service it is also necessary to transfer intersubchannel synchronization information. The traffic channel employs channel coding that aims at decreasing the effect of transmission errors. Channel coding and the aforementioned additional information increase the bit rate at the radio interface higher than the actual user rate. The radio interface rates corresponding to the user rates of 2400, 4800 and 9600 bit/s are 3600, 6000 and 12000 bit/s.

Figure 2:
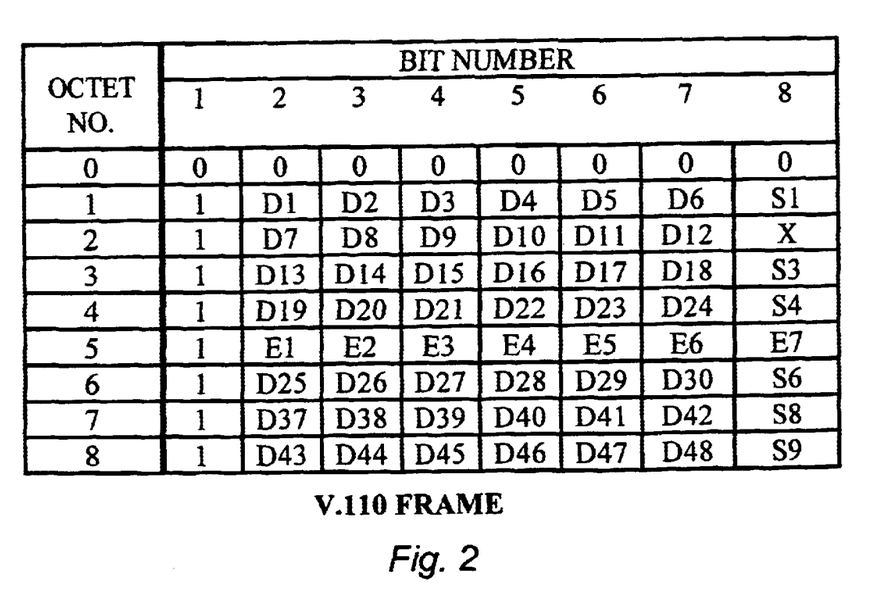
FIG. 2 shows a V.110 frame structure.

The frame structure used for data transmission over the V.110 connection is shown in FIG. 2. The frame consists of 80 bits. Octet 0 contains binary zeros, whereas octet 5 contains a binary one followed by seven E bits. Octets 1 to 4 and 6 to 9 contain a binary one in bit position 1, a status bit (S or X bit) in bit position 8 and six data bits (D bits) in bit positions 2 to 7. The bits are transmitted from left to right and from top to bottom. A frame thus comprises 48 bits of user data, i.e. D1 to D48. Bits S and X are used to transfer, in data transmission mode, channel control information related to the data bits. Four status bits S1, S3, S6 and S8 are used to transfer CT108 (Data Terminal Ready) from the MS to the IWF and to transfer the CT107 status signal from the IWF to the MS. Two status bits S4 and S9 are used to transmit the CT105 status signal from the MS to the IWF and to transfer the CT109 status signal from the IWF to the MS. Two X status bit are used to transmit the CT106 status signal (Ready for Sending) or the transmission synchronization or flow control information between the adaptors. When the terminal equipments are X.21 terminal equipments, the S bits transmit X.21 control information. The MS comprises a determined filtration procedure for receiving the CT106 and CT109 statuses and the X.21 indication.

Some of the control bits in the V.110 frame have also been redetermined in such a way that they transmit synchronization information that is needed to control data transmission using several parallel traffic channels. This multichannel data transmission and the related synchronization are described for example in Finnish patent application 945817. Since in HSCSD service practically the same status data is transmitted via several parallel traffic channels in the data transmission mode, the frames of each traffic channel comprise "extra" redundant status bits that can be deleted without any effect on the number of the repeated status bits or on the bit-error-ratio of the status,signals. For example in the case of two parallel channels, a double number of status bits are transmitted, and therefore half of the bits will be redundant. These redundant status bits can be used for intersubchannel synchronization by means of channel and frame numbering transmitted in the frames. The status bits can be selected for this purpose in several ways. For example bits S1, S4 and S6 may be used for channel numbering and one of the X bits may be used for 1-bit frame numbering within a channel.

It should be noted that the above-described status bits of the V.110 frame are only an example of terminal interface status information and of other information that would normally have to be transmitted in V.110 frames or in any other frames through a traffic channel. It is not essential to the invention what the status information or other possible control and synchronization information to be transmitted in addition to the user data actually contains. The invention is applicable more generally for transmitting all types of overhead information.

A GSM traffic channel thus comprises additional capacity for transmitting the required status and synchronization information in addition to the user data.

Figure 3:
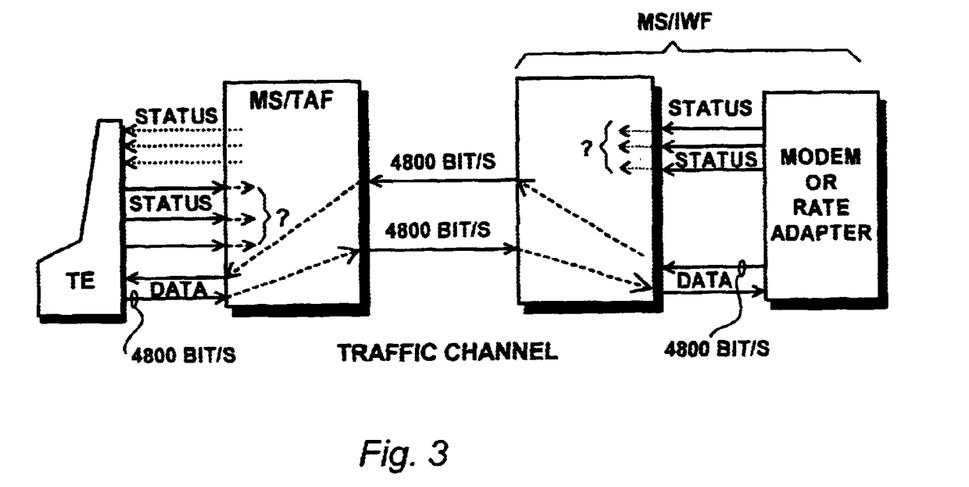
FIG. 3 is a block diagram generally illustrating the problem behind the invention, related to a traffic channel having a data rate equal to the user data rate.

Problems occur when a radio interface other than the GSM radio interface is used, and the data rate of the traffic channel of the interface is equal to the user data rate at the terminal interface, e.g. 4800 bit/s, as illustrated generally in the block diagram of FIG. 3. The traffic channel has no extra capacity that could be used to transmit other information in addition to the 4800 bit/s data. In practice, the data rate on the traffic channel should be reduced to 2400 bit/s.

Figure 4:
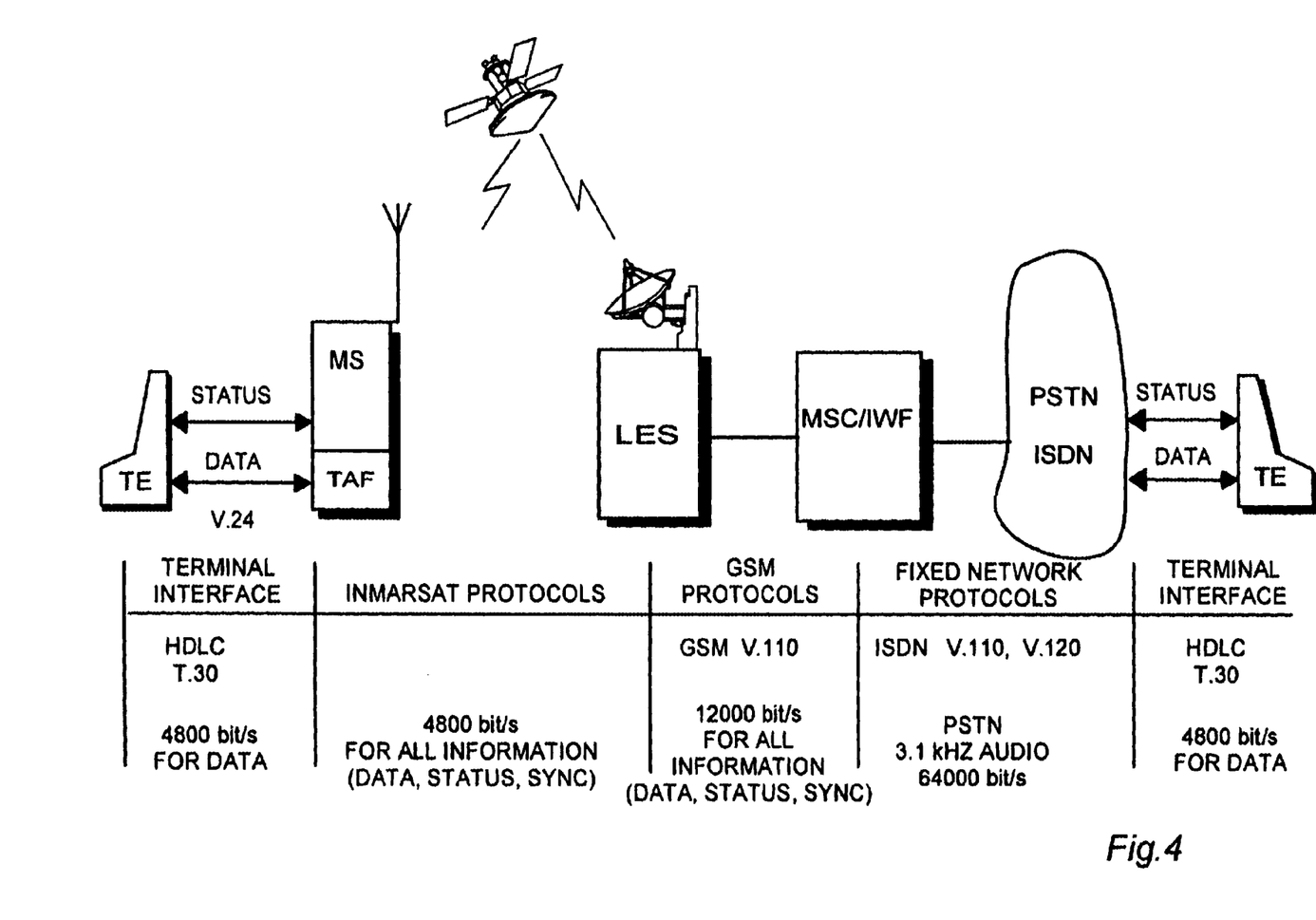
FIG. 4 is a block diagram showing how the Inmarsat-P satellite system is connected as a base station system to a GSM-based mobile system.

A practical example of a system where the Inmarsat-P satellite system is connected as a base station system to a GSM-based mobile system is shown in the block diagram of FIG. 4. In the Inmarsat satellite system, radio coverage is obtained by satellites instead of base stations located on the ground, the satellites being on an orbit circling the earth and transmitting radio signals between MSs (or user terminals UT) and LESs. The beam of the satellite forms a coverage area, i.e. a cell, on the earth. The coverage areas of individual satellites are arranged to form continuous coverage so that an MS is at all times located within the coverage area of at least one satellite. The number of the satellites required depends on the desired coverage. Continuous coverage on the surface of the earth might require for example 10 satellites. FIG. 4 shows, for the sake of clarity, only one LES, one satellite SAT and one MS. The LES is connected to the MSC of the GSM network in the same way as the BSS in FIG. 1. Also the GSM protocols between the MSC and the LES are the same as between the MSC and the BSS in FIG. 1 (GSM V.110). The terminal interface and the protocols thereof (HDLC, T.30) and the protocols of the fixed network (ISDN V.110/V.120 or PSTN 3.1 kHz audio) are also the same as in FIG. 1. The difference is that in FIG. 4 the GSM V.110 connection is not used over the entire connection between the MSC and the MS but the radio interface between the LES and the MS uses the Inmarsat protocols and traffic channels.

A radio interface consists of a bidirectional satellite radio connection between an MS and an LES. The exact structure or operation of the units SAT, LES and MS in the satellite system or the accurate specifications of the radio interface are not relevant to the present invention. The invention does not require changes in the actual satellite system the details of which can be obtained from the Inmarsat specifications. The only feature essential to the invention is the capacity of the traffic channel formed over the radio interface. The maximum data rate of a traffic channel in the Inmarsat-P system is 4800 bit/s, which creates the problem described in general in connection with FIG. 3, i.e. the terminal interface statuses cannot be transmitted through the traffic channel when the user data rate is 4800 bit/s.

Figure 5:
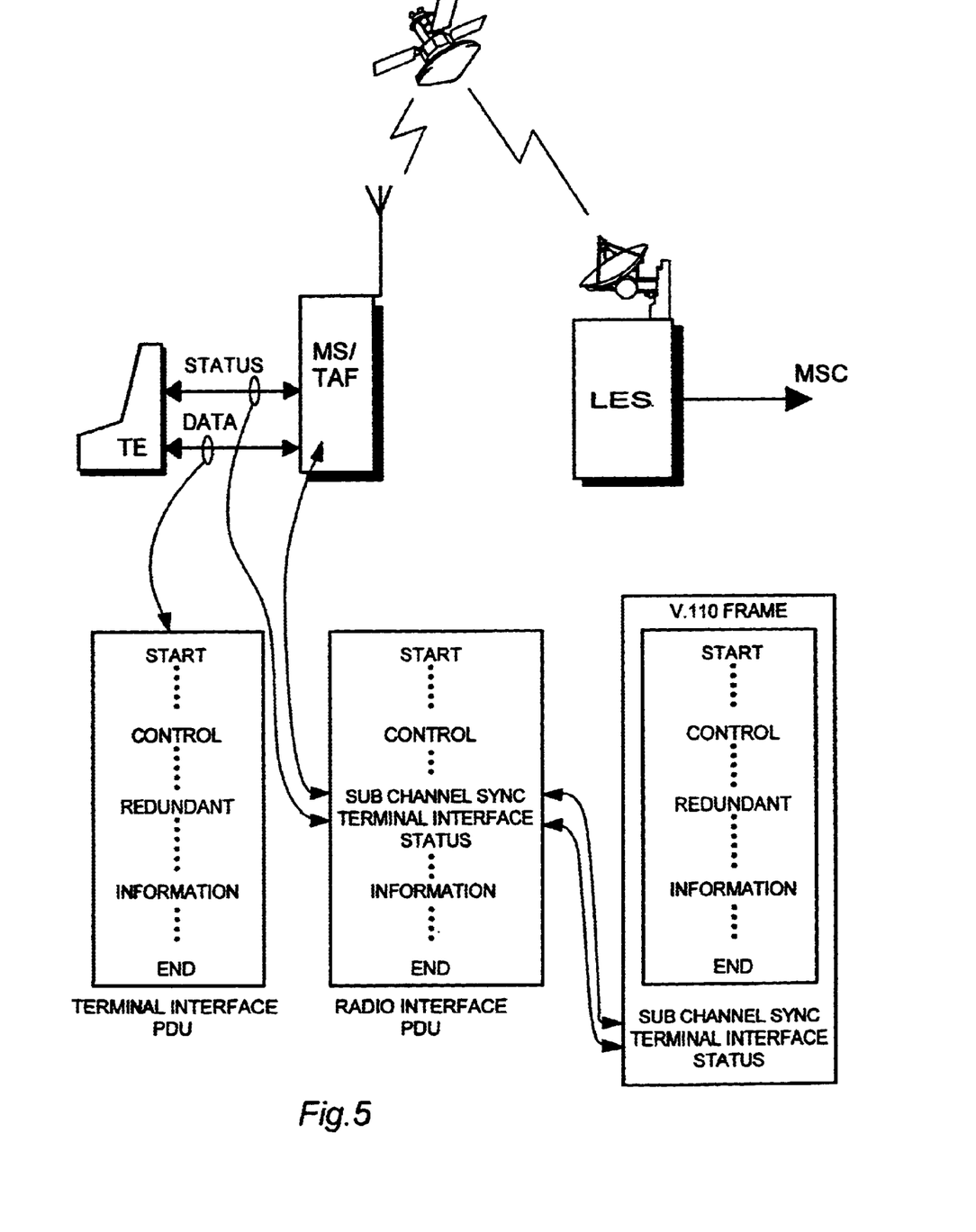
FIG. 5 is a block diagram illustrating the general arrangement according to the invention in the system of FIG. 4.

The arrangement according to the invention that also enables the transmission of the terminal interface status information without decreasing the user data rate lower than 4800 bit/s is illustrated generally in FIG. 5.

FIG. 5 shows generally the content of the protocol data unit (PDU) of the terminal interface that can be found in most protocols. The PDU firstly comprises fields, for example START and END, indicating the beginning and end of the PDU. The PDU also comprises control data (CONTROL) and the actual information to be transmitted (INFORMATION). The exact format of the PDU varies depending on the transmission protocol. However, there are redundant bits in the frame structures of all the transmission protocols of the terminal interface when the protocols are used in the PLMN environment, for example in the GSM network. These redundant bits that vary from one transmission protocol to another are represented generally by the field REDUNDANT in FIG. 5.

In the invention, the terminal interface status information and possibly other control or synchronization information are transmitted through a traffic channel in the redundant parts (REDUNDANT) of the PDUs of the transmission protocol(s) used on the channel. In the example of FIG. 5, the MS/TAF receives from the terminal interface the standard PDU and terminal interface status information, i.e. the V.24 control signals CT105 and CT108. The MS/TAF forms the PDU to be transmitted to the radio interface from the standard PDU by inserting the terminal interface status information to the redundant parts REDUNDANT. In multichannel HSCSD services the MS/TAF also inserts the information related to intersubchannel synchronization and described in connection with FIG. 2 in the redundant parts of the PDU (REDUNDANT).

The MS transmits the PDU of the radio interface to the LES via a satellite. The LES extracts the terminal interface status information and possible intersubchannel synchronisation information from the received PDU of the radio interface. The original redundancy of the PDU can be restored a) by restoring the original redundant information, if it is known, b) by maintaining the information added by the MS/TAF, or c) by inserting other arbitrary information in the redundant parts REDUNDANT. The LES then inserts the PDU and the overhead information according to the invention in the V.110 frame according to FIG. 2. More precisely, the LES inserts the content of the PDU in the data bits D1 to D48 of the V.110 frame, the terminal interface status information in the status bits S1 to S9, and the possible intersubchannel synchronization information for example in bits S1, S3 and X, as described in connection with FIG. 2. The V.110 frame is forwarded to the MSC.

In the opposite transmission direction from the MSC to the MS the procedure is reverse. The data bits D1 to D48 of the V.110 frame are formed in the LES into the PDU of the radio interface, and the terminal interface status information and the possible intersubchannel synchronization information from bits S1 to S9 and X are inserted in the redundant parts of the PDU (REDUNDANT). The PDU is transmitted via the radio interface from the LES to the MS/TAF. The MS/TAF restores the original PDU of the terminal interface, the terminal interface status information STATUS and the possible synchronization information from the PDU of the radio interface. The MS/TAF forwards the PDU to the TE over the data lines DATA and the status information over the status lines STATUS.

In the following, examples of transmission protocols having redundant bits that can be used for transmitting the overhead information according to the invention will be described with reference to FIGS. 6 to 12.

For example the GSM network services utilize a point-to-point connection. This means that most transmission protocols have redundant bits in their frame structure when used in the GSM environment.

For example HDLC-based protocols support a point-to-multipoint connection. A point-to-multipoint connection requires an address field in the frame structure. This address field is redundant in a point-to-point environment, such as the GSM, and it can be used in the present invention.

Figure 6:
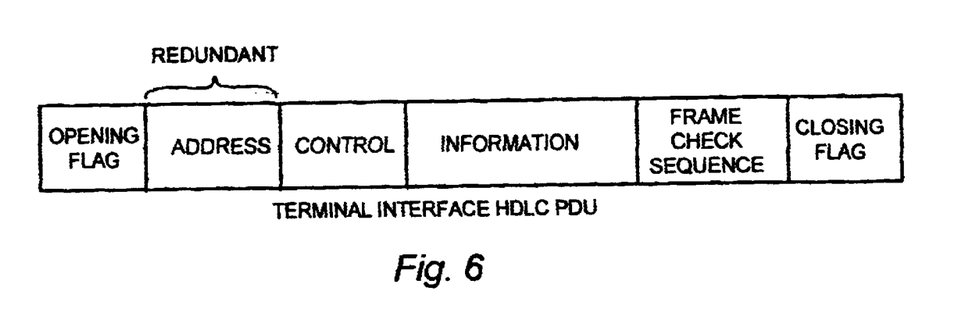
FIG. 6 shows a standard HDLC frame and FIG. 7 shows an HDLC frame modified according to the invention.
Figure 7:
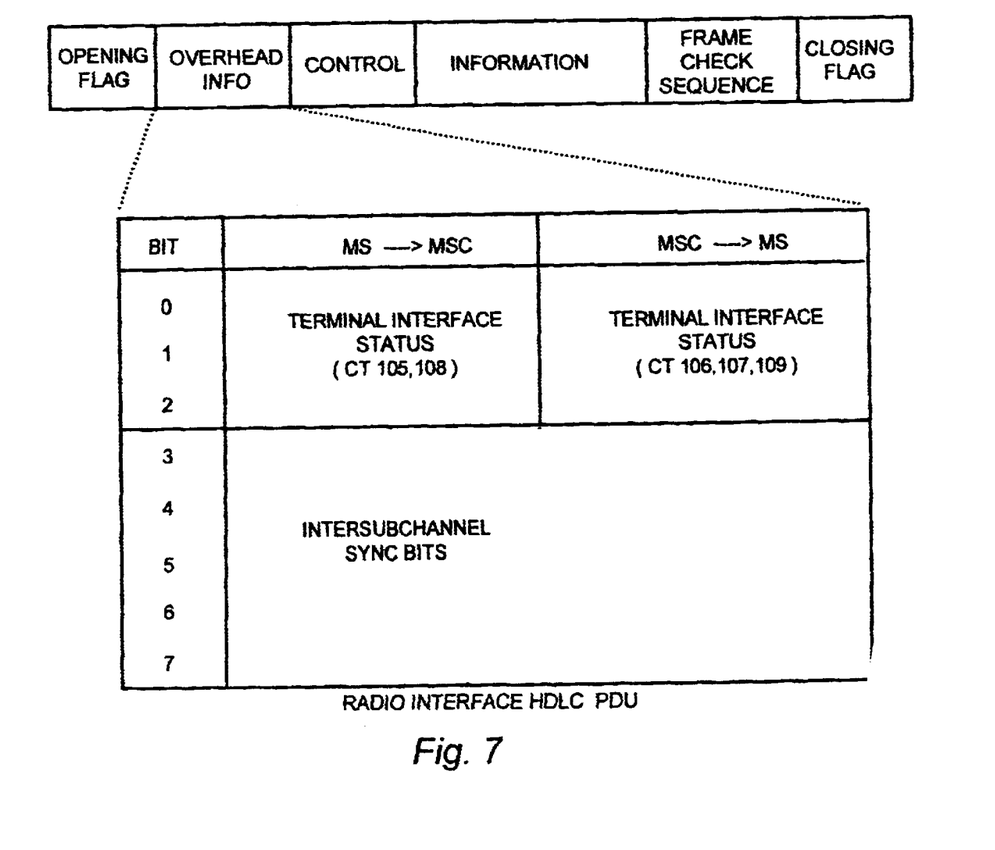

HDLC is the protocol of the ITU-T X.25 link layer having a standard frame structure shown in FIG. 6. This frame structure may be employed as the terminal interface PDU shown in FIG. 5, the redundant part being the ADDRESS field. FIG. 7 shows the HDLC PDU of the radio interface where the overhead information according to the invention is transmitted in the redundant ADDRESS field.

More precisely, three bits (e.g. bits 0, 1, 2) in the 8-bit ADDRESS field may be used to carry the terminal interface status information (CT105, 108 from the MS to the MSC, and CT106, 107 and 109 from the MSC to the MS) and five bits (e.g. bits 3 to 7) may be used to carry the intersubchannel synchronization bits in the HSCSD service.

One of the most important services of mobile systems is the facsimile service. The facsimile service of the GSM system is determined in the GSM recommendation 03.45. In the facsimile service, a special facsimile adapter is determined between the telefax terminal (FAX) and an MS. The required equipment configuration is defined in the GSM recommendation 03.45 and the details thereof are not relevant to the invention. In FIGS. 1, 3, 4 and it can be assumed that the telefax terminal FAX and the facsimile adapter are included in the TE and the terminal interface is a V.24-interface between the facsimile adapter and the MS.

The idea of the GSM recommendation 03.45 is to allow the ITU-T T.30 protocol to pass transparently through the GSM data connection whenever possible. The T.30 protocol is only manipulated when it is necessary to avoid problems resulting from the differences between the PSTN and the GSM systems. The transparent synchronous GSM facsimile protocol uses the T.30 HDLC frame in the Binary Coded Signalling phase and in the error-corrected facsimile data transmission phase. It is then possible to utilize the redundant address field in the HDLC frame, as described above in connection with FIGS. 6 and 7. There are also other functional phases where GSM-specific frames are transmitted: SYNC and STATUS. These frames contain redundancy in the form of repeated pieces of the same information.

More precisely, the protocol structure used in the GSM facsimile service is strictly based on a synchronous arrangement utilizing fixed-length frames of 64 bits. In other words, information is transmitted over the GSM connection in frames of 64 bits, in sequence and without interruption during the entire call. The content of each frame depends on the mode of the call.

Figure 8:
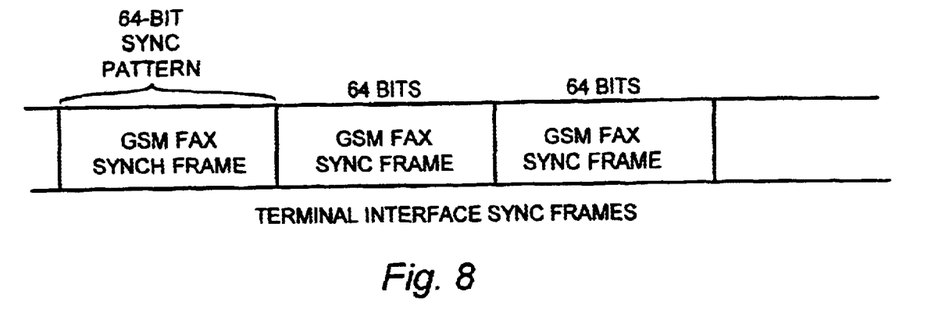
FIG. 8 shows a SYNCH frame according to GSM recommendation 03.45
Figure 9:
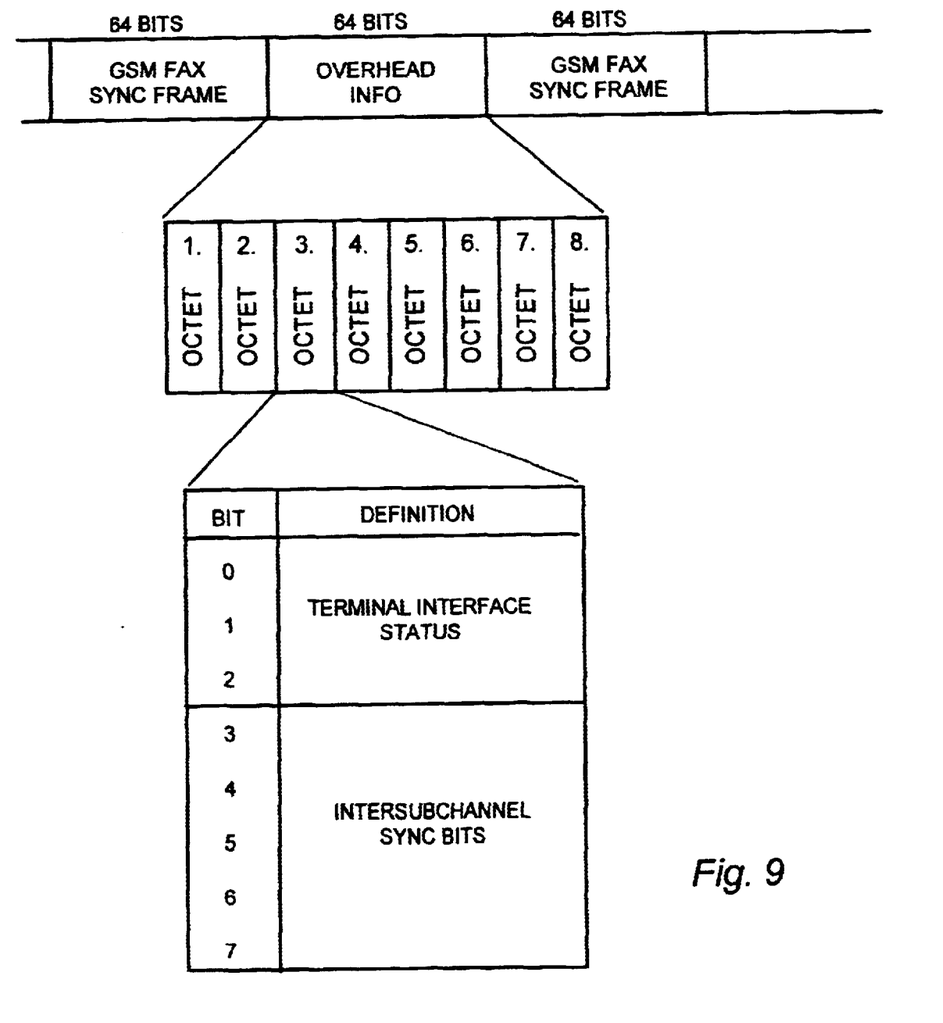
FIG. 9 shows a SYNCH frame modified according to the invention.

FIG. 8 shows a standard SYNC frame designed to enable synchronization at the other end. Each synchronization frame consists of a 64-bit pattern and SYNC frames are transmitted in a continuous uninterrupted sequence until the next mode is entered into in the call. This repetition of the synchronization pattern contains redundancy that can be used in the present invention. Every nth frame can be used to transmit the terminal interface status information and possible subchannel synchronization information. n can be for example 64. FIG. 9 illustrates an embodiment of the invention where the nth SYNC frame contains overhead information according to the invention. The 64-bit frame is divided into eight octets. In each octet for example three bits (e.g. bits 0, 1 and 2) are reserved for transmitting the terminal interface status information and five bits (e.g. bits 3 to 7) are reserved for possible subchannel synchronization bits. Compared to the general case shown in FIG. 5, the frame structure of FIG. 8 forms the terminal interface PDU and the frame structure of FIG. 9 forms the radio interface PDU.

Figure 10:
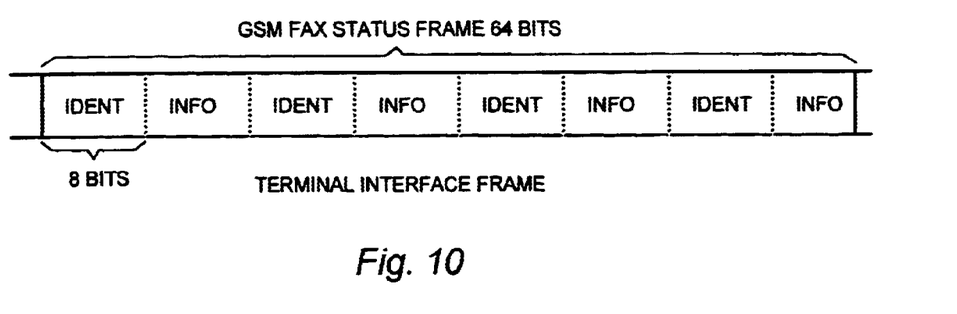
FIG. 10 shows a STATUS frame according to GSM recommendation 03.45

FIG. 10 shows a standard STATUS frame that consists of eight octets. Uneven octets contain mode identification codes (IDENT) and even octets contain status-specific information (INFO). In order to improve the probability of error detection, each IDENT octet in the frame repeats the same code. This redundancy caused by the repetition can be utilized in the present invention.

Figure 11:
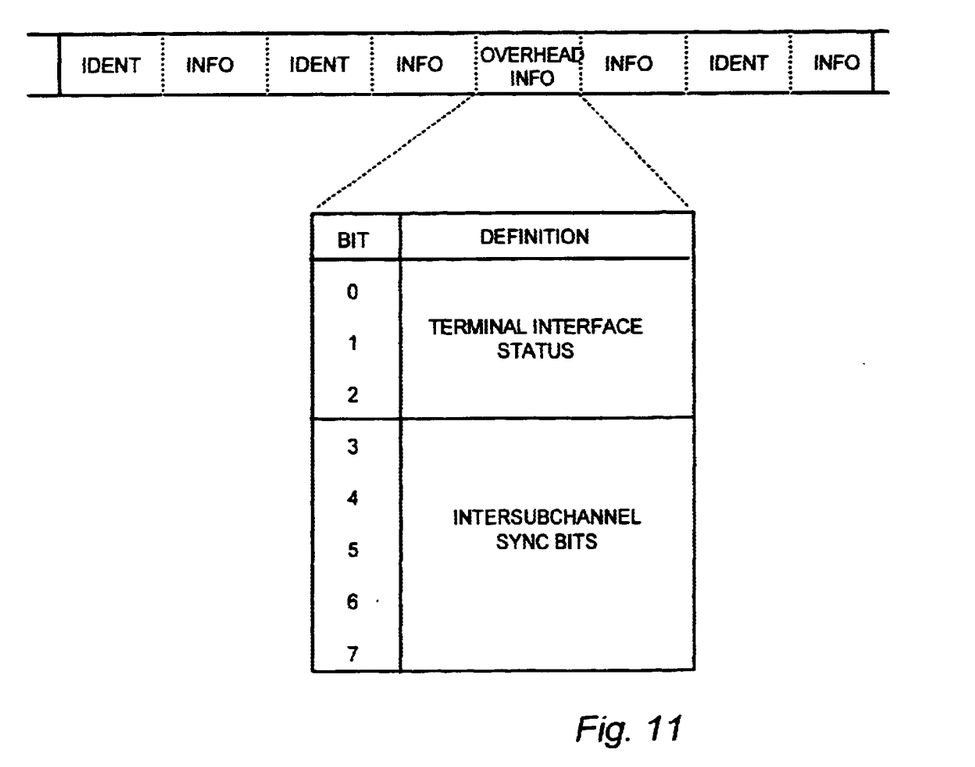
FIG. 11 shows a STATUS frame modified according to the invention.

FIG. 11 shows an embodiment of the invention where one IDENT octet contains overhead information according to the invention. For example three bits (e.g. bits 0, 1, 2) may be used for the terminal interface status information and for example five bits (e.g. bits 3 to 7) may be used for the subchannel synchronization information. Compared to the general case shown in FIG. 5, the frame structure of FIG. 10 forms the terminal interface PDU and the frame structure of FIG. 11 forms the radio interface PDU.

Figure 12:
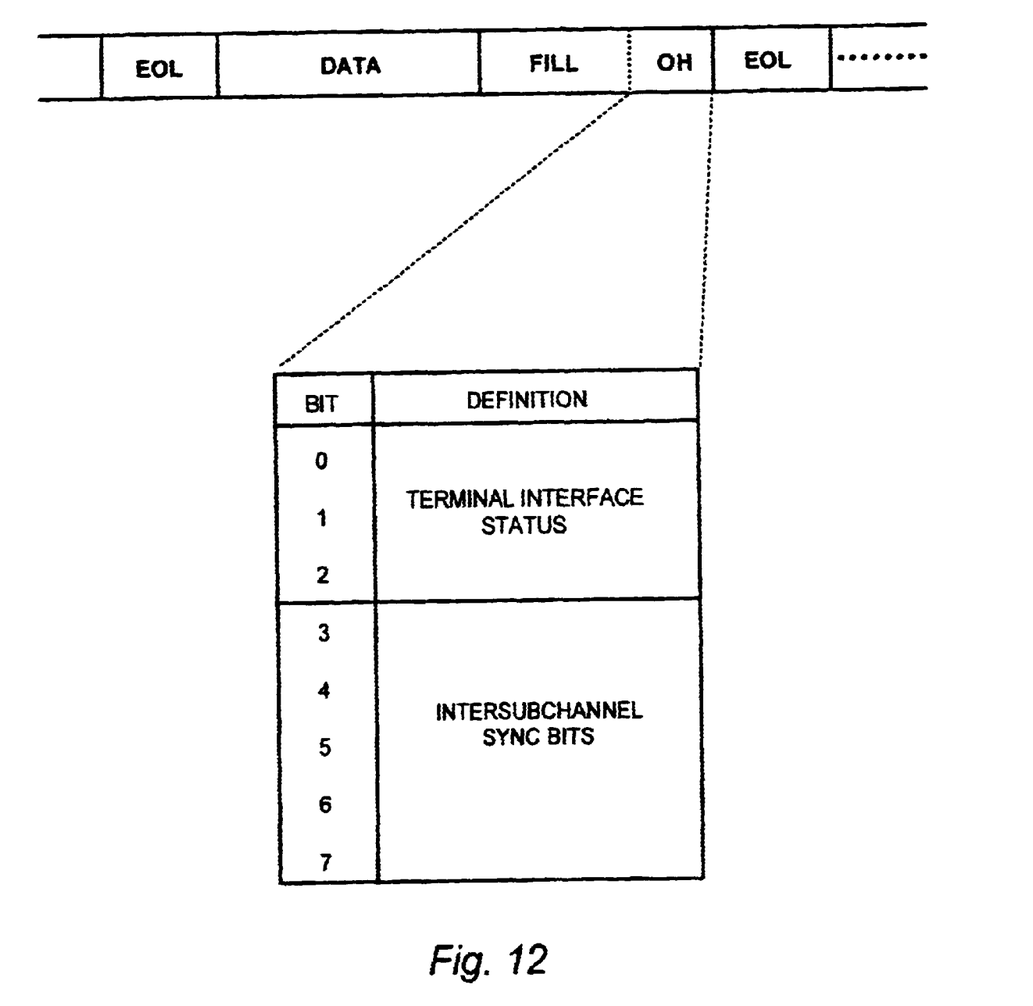
FIG. 12 shows a FILL field modified according to the invention in a normal facsimile data (NFD) mode.

When the facsimile service utilizes the normal facsimile data mode (NFD) according to the T.30 recommendation, the data to be transmitted comprises EOL (End_Of_Line) symbols, facsimile-coded data DATA and possible stuff bits FILL to ensure the minimum length of the line, as shown in FIG. 12. These stuff bits can be considered redundant from the point of view of transmission and used in the present invention. FIG. 12 illustrates how the terminal interface status information and the subchannel synchronization information can be placed at the end of the facsimile-coded lines to replace some of the FILL bits. For example three bits (bits 0, 1 and 2) may be reserved for the terminal interface status information and five bits (e.g. bits 3 to 7) may be reserved for the intersubchannel synchronization information. In such a case, a normal facsimile-coded line forms the terminal interface PDU shown in FIG. 5 and the line according to FIG. 12 forms the radio interface PDU.

Long lines do not contain FILL bits in the NFD mode. This can lead to a situation where FILL bits must be added to the line only for the purpose of the overhead information transmission according to the invention. In such a case, the amount of the data to be transmitted over the radio path increases. However, since telefax terminals change from the data phase to the signalling phase each time a page has been transmitted, the situation can be easily handled by slight buffering in the LES and the MS.

The figures and the description related thereto are only intended to illustrate the present invention. The details of the invention may vary within the spirit and scope of the appended claims.

What is claimed is:

1. A synchronous data transmission method for transmitting control or synchronization information, the control or synchronization information including terminal interface user data and status information, through a traffic channel or a set of traffic channels in a telecommunication system supporting point-to-point transmission, said method comprising:

inserting, at a transmitting end, the control or synchronization information to an address field of protocol data units of the transmission protocol used at the terminal interface and supporting point-to-multipoint transmission;

transmitting the protocol data units containing the control or synchronization information through said traffic channel or set of traffic channels, a maximum data rate of the traffic channel or a total maximum data rate of the set of traffic channels being equal to a user data rate at the terminal interface; and extracting, at a receiving end, the control or synchronization information from the address field of protocol data units and restoring an original redundancy to the protocol data units.

2. A method according to claim 1, wherein the telecommunication system is a mobile communication system having a radio interface containing said traffic channel or set of traffic channels, and comprising inserting the control and synchronization information in a synchronization frame of the facsimile service.

3. A method according to claim 1, wherein the telecommunication system is a mobile communication system having a radio interface containing said traffic channel or set of traffic channels, and the method comprising inserting said control and synchronization information in a status frame of the facsimile service.

4. A method according to claim 1, wherein the telecommunication system is a mobile communication system having a radio interface containing said traffic channel or set of traffic channels, and comprising inserting the control and synchronization information at the end of a facsimile-coded line as filler information.

5. A method according to claim 1, wherein said traffic channel is a traffic channel of a satellite system.

6. An arrangement for transmitting control or synchronization information, the control or synchronization information comprising: terminal interface user data and status information, through a traffic channel in a telecommunication system supporting point-to-point transmission, wherein
   a maximum data rate of the traffic channel or a total maximum data rate of a set of traffic channels is equal to a user data rate at the terminal interface,
   transmission equipment is arranged to insert the control or synchronization information in an address field of the protocol data units of the transmission protocol used at the terminal interface and supporting point-to-multipoint transmission, and to transmit the protocol data units through said traffic channel or set of traffic channels to receiving equipment, and
   the receiving equipment is arranged to extract the control and synchronization information from the address field of protocol data units, and to restore an original redundancy to the protocol data units.

7. An arrangement according to claim 6, wherein the telecommunication system is a mobile communication system comprising a radio interface containing said traffic channel or set of traffic channels.

8. An arrangement according to claim 7, wherein said radio interface comprises a satellite connection.

9. An arrangement according to claim 8, wherein
   said satellite system comprises at least one land earth station connected as a base station system to a mobile services switching centre of the mobile system in such a way that the transmission protocols and traffic channels of the mobile system are in use between the land earth station and the mobile services switching centre,
   said radio interface is between the land earth station and a mobile station through a satellite repeater, and the transmission protocols and traffic channels of the satellite system are employed in the radio interface,
   said terminal interface is located between the mobile station and the terminal equipment and it employs standard terminal equipment protocols.

10. An arrangement according to claim 9, wherein
    the mobile station is arranged to insert the terminal interface status information and possibly other control or synchronization information in the redundant parts of the protocol data units of the transmission protocol used at the terminal interface and to transmit the protocol units through a traffic channel or a set of traffic channels of the satellite channel to the land earth station,
    the land earth station is arranged to extract said status information and possibly other control or synchronization information from the received protocol data units and to restore the original redundancy to the protocol data units,
    the land earth station is arranged to insert the restored protocol data unit and said status information and possibly other control and synchronization information in a frame according to the transmission protocol mobile system and to transmit the frame to the services switching centre.

11. An arrangement according to claim 9 wherein
    the land earth station is arranged to extract the protocol data unit of the transmission protocol used at the terminal interface and the terminal interface status information and possibly other control or synchronization information from the frame that is received from the mobile services switching centre and that complies with the protocol of the mobile system,
    the land earth station is arranged to insert said terminal interface status information and possibly other control or synchronization information in the redundant parts of said protocol data unit and to transmit the protocol data unit through the traffic channel or set of traffic channels of the satellite system to the mobile station,
    the mobile station is arranged to extract said status information and possibly other control and synchronization information from the received protocol data units and to restore the original redundancy to the protocol data units,
    the mobile station is arranged to forward the restored protocol data unit and said status information through said terminal interface to the terminal equipment.

12. An arrangement for transmitting control or synchronization information, the control or synchronization information comprising terminal interface user data and status information, through a set of traffic channels in a telecommunication system supporting point-to point transmission, wherein
    a total maximum data rate of the set of traffic channels is equal to a user data rate at the terminal interface,
    transmission equipment is arranged to insert the control or synchronization information in an address field of protocol data units of a transmission protocol used at the terminal interface and supporting point-to-multipoint transmission, and to transmit the protocol data units through said set of traffic channels to receiving equipment,
    the receiving equipment is arranged to extract the control and synchronization information from the address field of protocol data units, and to restore an original redundancy to the protocol data units, and
    the control and synchronization information further comprises synchronization information for synchronization between said set of traffic channels.

13. A synchronous data transmission method for transmitting control or synchronization information, the control or synchronization information including terminal interface user data and status information, through a set of traffic channels in a telecommunication system supporting point-to-point transmission, said method comprising:
    inserting, at a transmitting end, the control or synchronization information to an address field of protocol data units of the transmission protocol used at the terminal interface and supporting point-to-multipoint transmission;
    transmitting the protocol data units containing said control or synchronization information through said set of traffic channels, a total maximum data rate of the set of traffic channels being equal to a user data rate at the terminal interface; and
    extracting, at a receiving end, said control or synchronization information from the address field of protocol data units and restoring an original redundancy to the protocol data units,
    wherein said other control and synchronization information further includes synchronization information for synchronization between said set of traffic channels.

* * * * *